United States Patent
Sugiyama

(10) Patent No.: US 7,400,786 B1
(45) Date of Patent: Jul. 15, 2008

(54) OPTICAL MODULATOR AND OPTICAL TRANSMITTER

(75) Inventor: Masaki Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 70 days.

(21) Appl. No.: 11/646,452

(22) Filed: Dec. 28, 2006

(30) Foreign Application Priority Data

Aug. 30, 2006 (JP) .............................. 2006-232998

(51) Int. Cl.
*G02F 1/035* (2006.01)
(52) U.S. Cl. ..................................... 385/2; 385/3; 385/8
(58) Field of Classification Search ...................... 385/2, 385/3, 8
See application file for complete search history.

(56) References Cited

U.S. PATENT DOCUMENTS

| 6,033,126 A * | 3/2000 | Omori et al. ................... 385/88 |
| 2006/0029319 A1 | 2/2006 | Sugiyama | |

FOREIGN PATENT DOCUMENTS

| EP | 1 199 593 A | 4/2002 |
| JP | 2000-275589 | 10/2000 |
| JP | 2003-228033 | 8/2003 |
| JP | 2005-221874 | 8/2005 |
| JP | 2005-284129 | 10/2005 |
| JP | 2006-47746 | 2/2006 |

OTHER PUBLICATIONS

Viet Pham Ha, et al.; "Electrooptic modulator with arbitrary frequency response utilizing nonperiodic polarization reversal", Laser and Elecro-Optics, 2005; Cleo/Pacific Rim 2005.; Pacific Rim Conference on Tokyo, Japan 30-02 Aug. 2005, Piscataway, NJ, USA, IEEE, Aug. 30, 2005 (pp. 175-176).
Hui K-W, et al.; "Design of modified phase reversal electrode in broadband electrooptic modulators at 100 GHz", IEEE Transactions on Microwave Theory and Techniques, IEEE Service Center, Piscataway, NJ, US, vol. 45, No. 1, Jan. 1997 (pp. 142-145).
European Search Report; mailed Apr. 16, 2007 and presents case and prior art information list; this is the first citation of the references in any communication from foreign patent office in a counterpart foreign application.

* cited by examiner

*Primary Examiner*—Hemang Sanghavi
(74) *Attorney, Agent, or Firm*—Staas & Halsey LLP

(57) ABSTRACT

In an optical modulator of the invention, a signal electrode and a ground electrode are formed along a pair of branching waveguides of a Mach-Zehnder type optical waveguide, and a first region positioned on an input side of an interaction section of light and an electric signal is made a forward modulation section, and a second region positioned on an output side is made an inverse modulation section, and a spacing or the like of the signal electrode and the ground electrode is optimized so that that a loss produced in the second region is relatively greater than a loss produced in the first region, with respect to a high frequency component of an electric signal propagated through the signal electrode. As a result a wider modulation bandwidth can be realized.

31 Claims, 15 Drawing Sheets

FIRST EMBODIMENT OF THE INVENTION

FIRST EMBODIMENT OF THE INVENTION

CROSS-SECTION b-b'

SECOND EMBODIMENT OF THE INVENTION
CROSS-SECTION a-a'

CROSS-SECTION b-b'

TAN δ OF A MATERIAL CONSTITUTING A BUFFER LAYER

THIRD EMBODIMENT OF THE INVENTION

FOURTH EMBODIMENT OF THE INVENTION

FIFTH EMBODIMENT OF THE INVENTION

SIXTH EMBODIMENT OF THE INVENTION

EIGHTH EMBODIMENT OF THE INVENTION

NINTH EMBODIMENT OF THE INVENTION

CROSS-SECTION a-a'

CROSS-SECTION c-c'

CROSS-SECTION c-c'

CROSS-SECTION c-c'

CONFIGURATION EXAMPLE OF
CONVENTIONAL OPTICAL MODULATOR
WITH WIDENED BAND

OPTICAL MODULATOR AND OPTICAL TRANSMITTER

BACKGROUND OF THE INVENTION

1. Field of the Invention

The present invention relates to an optical modulator and an optical transmitter used for optical transmission, and in particular relates to an optical modulator of a waveguide type which modulates light using an electro-optic effect, and to an optical transmitter which uses this.

2. Description of the Related Art

For example, an optical waveguide device which uses an electro-optic crystal such as lithium niobate (LiNbO$_3$), lithium tantalate (LiTaO$_2$) or the like, is manufactured by forming a metal film on a part of a crystal substrate and thermal diffusing, or by proton exchanging in benzoic acid after patterning, to thereby form an optical waveguide, and afterwards providing electrodes in the vicinity of the optical waveguide. As one optical waveguide device which uses an electro-optic crystal, there is known an optical modulator as shown for example in FIG. 28.

In general, the optical modulator, depending on the shape of the optical waveguide, is divided into a phase modulator as shown at the top of FIG. 28, and an intensity modulator as shown at the bottom of FIG. 28. In the case of the phase modulator, a signal electrode 131 is formed on one optical waveguide 102 which is formed on a substrate 101. Furthermore, in the case of the intensity modulator, the optical waveguide 102 comprises an input waveguide 121, a branching section 122, branching waveguides 123 and 124, a multiplexing section 125, and an output waveguide 126, and a coplanar electrode is formed with a signal electrode 131 provided on one branching waveguide 123, and a ground electrode 132 provided on the other branching waveguide 124.

In such an optical modulator, for example in the case where a Z-cut substrate 101 is used, the refractive index change due to an electric field in the Z-direction is used. Therefore, the electrode is arranged directly above the optical waveguide 102. More specifically, in the case of the intensity modulator at the bottom of FIG. 28, the signal electrode 131 and the ground electrode 132 are respectively patterned on the branching waveguides 123 and 124. At this time, in order to prevent the light propagated through the respective branching waveguides 123 and 124 being absorbed by the signal electrode 131 and the ground electrode 132, a buffer layer (not shown in the figure) is provided between the substrate 101 and the electrodes 131 and 132. For the buffer layer, an oxide silicon (SiO$_2$) or the like of a thickness of 0.2 μm to 1 μm is used.

In the case of driving the above optical modulator at a high speed, the output terminal of the signal electrode 131 is made a traveling-wave electrode by grounding via a resistance (not shown in the figure), and a high frequency electric signal E such as a microwave is applied from an input terminal of the signal electrode 131. At this time, due to the electric field generated between the signal electrode 131 and the ground electrode 132, the refractive index of the optical waveguide 102 changes. Therefore, in the phase modulator at the top of FIG. 28, the phase of the light L propagated through the optical waveguide 102 is modulated in accordance with the electric signal E. Furthermore, in the intensity modulator at the bottom of FIG. 28, the refractive index of the branching waveguides 123 and 124 is changed for each, so that the phase difference of the light L propagated through each of these is changed, and an intensity modulated signal light L is output from the output waveguide 126.

In the optical modulator driven at high speed as described above, it is known that a wide band optical response characteristic is obtained by controlling the effective refractive index for the electric signal E by changing the cross-section shape of the signal electrode 131, and matching the propagation speed of the light L and the electric signal E. However, regarding the electric signal E propagated through the signal electrode 131, if the frequency thereof becomes high, the transmission losses increase. Therefore there is a problem in that the modulation band width is limited, so that high speed modulation becomes difficult.

As previous technology related to widening the band width of the optical modulator, for example as shown in FIG. 29, a configuration has been proposed where, of the interaction section for the light L and the electric signal E, the direction of the refractive index change is reversed by inverting the polarization direction in the remaining part 111 (surrounded by the dotted line in the figure) with respect to the polarization direction of the substrate 101 (direction of the crystal axis) of the part from the input side to a certain length (refer for example to Japanese Unexamined Patent Publication Nos. 2005-284129, 2005-221874, and 2006-47746). By means of this configuration, when modulation in the non-inversed region where the polarization direction is not changed is the forward direction, then in the polarization inversed region, modulation in the opposite direction occurs. That is to say, the polarization inversed part becomes an inverse modulated section, and the other part becomes a forward modulated section. As described above, since the loss of the electric signal E is great at high frequency, the intensity of the inverse modulation in the polarization inversed region is great at low frequency, and is small at high frequency. As a result, in the overall optical modulator, the modulation at low frequency is suppressed, so that the high frequency dependency is reduced, that is, the modulation bandwidth becomes wide.

Furthermore, as another conventional technology for improving the response characteristics of the optical modulator or the like, a configuration is also proposed where the electrode width of the signal electrode and the ground electrode is changed along the light propagation direction, to thereby prevent resonance of an acoustic wave (for example surface acoustic wave) which is produced when a modulating signal of a high pulse shape is applied between the electrodes, so that occurrence of ripple is suppressed, (refer for example to Japanese Unexamined Patent Publication No. 2000-275589).

However, in the conventional technology which gives a wider band width by using the above inverse modulation, since the modulation component of the high frequency band in the polarization inversed region (inverse modulation section) has not become small enough, then in the high frequency band, a certain amount of inverse modulation occurs. Therefore there is a problem in that the amount of improvement in bandwidth is limited.

Furthermore, in the conventional technology for improving the response characteristics by changing the electrode width of the signal electrode and the ground electrode along the light propagation direction, the influence on the light due to the resonance of the generated acoustic wave attributable to the piezoelectricity of the substrate can be reduced, but an increase in the propagation loss of the electrical signal in the high frequency as mentioned above cannot be effectively suppressed. Therefore there is the problem that it is difficult to realize a wider band width.

SUMMARY OF THE INVENTION

The present invention addresses the abovementioned points with an object of providing an optical modulator which can realize a wider modulation bandwidth, and an optical transmitter which uses this.

In order to achieve the above object, in an optical modulator of the present invention which comprises a substrate having an electro-optic effect, an optical waveguide formed on the substrate, a signal electrode formed on the substrate, and a ground electrode formed on the substrate at a distance from the signal electrode, and in which in a first and second region set in an interaction section where light propagated through the optical waveguide, and an electrical signal propagated through the signal electrode interact with each other, a modulation direction in the first region positioned on an input side in a light propagation direction, and in the second region positioned on an output side, are reversed, and the first and second regions are configured such that a loss produced in the second region is relatively greater than a loss produced in the first region, with respect to a high frequency component of an electric signal propagated through the signal electrode.

In an optical modulator of the abovementioned configuration, the loss with respect to the high frequency component of the electrical signal in the second region on the output side of the interaction section is made relatively greater than the loss with respect to the high frequency component of the electrical signal in the first region on the input side of the interaction section. As a result the inverse modulation in the high frequency band in the second region where the modulation direction is reversed to that of the first region is suppressed more than for a conventional optical modulator which uses inverse modulation. Therefore a wider modulation bandwidth is realized.

Furthermore, the optical transmitter of the present invention, uses the abovementioned optical modulator to externally modulate and transmit an outgoing beam from a light source. In such an optical transmitter, modulated signal light can be transmitted to the outside at a faster rate.

According to the optical modulator of the present invention as described above, by making the loss of the second region with respect to the high frequency component of the electrical signal propagated through the signal electrode relatively large, the modulation band in the overall optical modulator can be made a wider band, and modulation at a higher speed than heretofore is possible. According to the optical transmitter which uses such an optical modulator, optical signals having a wider bandwidth can be transmitted, and hence a characteristic improvement of the error rate and the like on the reception side becomes possible.

Other objects, characteristics, and advantages of the present invention will become apparent from the following description of the embodiments, in conjunction with the appended drawings.

DETAILED DESCRIPTION OF THE INVENTION

Hereunder is a description of a best mode for carrying out the present invention with reference to the appended drawings. Throughout the drawings the same reference symbols denote the same or equivalent components.

Figure 1:
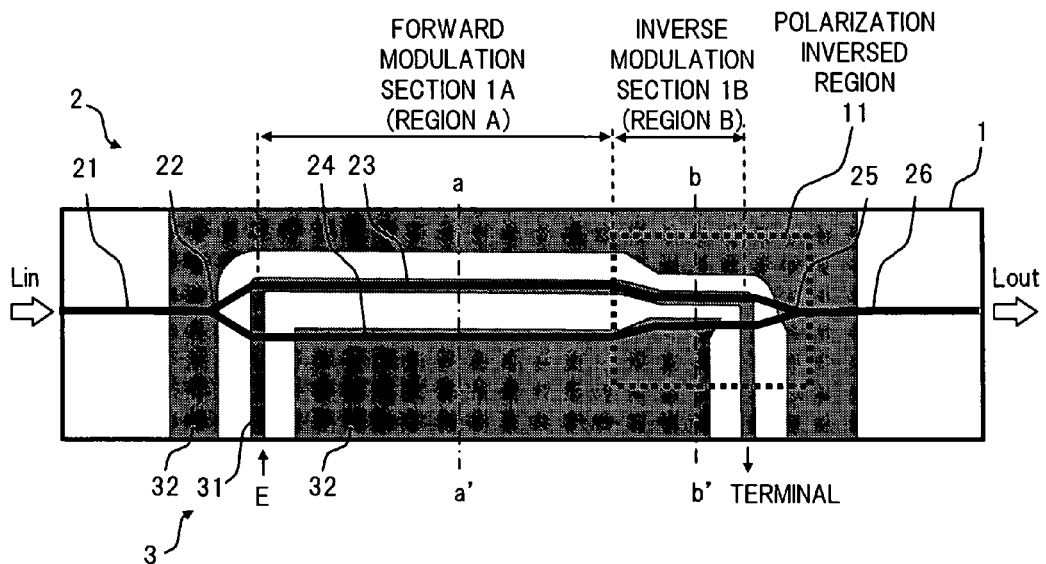
FIG. 1 is a plan view showing a configuration of an optical modulator according to a first embodiment of the present invention.

FIG. 1 is a plan view showing a configuration of an optical modulator according to a first embodiment of the present invention. Moreover, FIG. 2 is an enlarged view of section a-a' and section b-b' in the optical modulator of FIG. 1.

Figure 2:
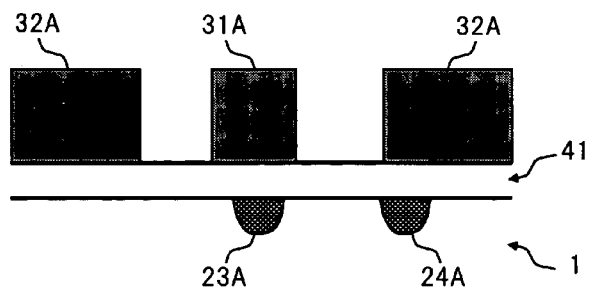
FIG. 2 is an enlarged view of section a-a' and section b-b' of FIG. 1.
Figure 2:
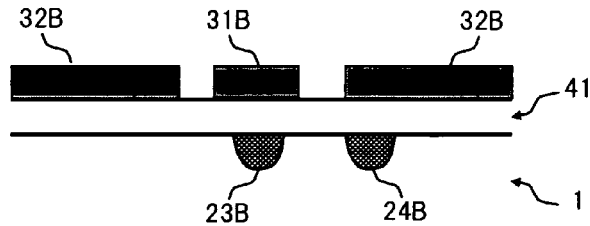

In FIG. 1 and FIG. 2, the optical modulator of the first embodiment comprises for example a substrate 1 having an electro-optic effect, an optical waveguide 2 of a Mach-Zehnder type formed on the substrate 1, and an electrode 3 formed on the surface of the substrate 1.

The substrate 1 uses a crystal substrate of for example Z-cut lithium niobate (LiNbO$_3$) or Lithium Tantalate (LiTaO$_2$), and in a region (hereunder interaction section) where light propagated through the optical waveguide 2 and an electric signal E propagated through the electrode 3 interact, a first region A on the input side which spans from the light input end over a predetermined length in the longitudinal direction (the light propagation direction) is made a forward modulation section 1A, and a second region B remaining on the output side is made an inverse modulation section 1B. In the inverse modulation section 1B is formed a polarization inversed region 11 enclosed by the dashed line in the figure. The polarization inversed region 11 is a region where the polarization direction (crystal axis direction) of the substrate 1 is inversed, and is formed for example by impressing a high pulse electric field on the substrate 1 which has been patterned with resist or the like.

The optical waveguide 2 has, for example, an input waveguide 21, a branching section 22, branching waveguides 23 and 24, a multiplexing section 25, and an output waveguide 26, and constitutes a Mach-Zehnder interferometer. This optical waveguide 2 is formed on the surface of the substrate 1 by applying a process such as thermal diffusion of titanium (Ti) or the like, or proton exchange. Regarding the distance between the pair of branching waveguides 23 and 24 (hereunder the waveguide spacing), the waveguide spacing in the inverse modulation section 1B is relatively narrower than the waveguide spacing in the forward modulation section 1A. At the boundary portion spreading from the forward modulation section 1A to the inverse modulation section 1B, the waveguide spacing becomes gradually narrower. Furthermore, the aforementioned waveguide spacing is designed so that it becomes wider than the spacing for where coupling is produced with the light propagating through the respective branching waveguides 23 and 24.

The electrode 3 has a signal electrode 31 and a ground electrode 32. Opposite ends of the signal electrode 31 are positioned on one side of the substrate 1, and the central portion is patterned so as to follow along above one branching waveguide 23. The ground electrode 32 is arranged at a necessary distance apart from the signal electrode 31. A buffer layer 41 which uses SiO$_2$ or the like, is formed between the surface of the electrode 3 and the substrate 1 in order to prevent the light propagated through the optical waveguide 2 from being absorbed by the electrode 3.

The signal electrode 31 is made a traveling-wave electrode by grounding one end positioned at the bottom right in FIG. 1 via a resistance (not shown in the figure), and an electric signal E of a high frequency corresponding to the modulation data is applied from another terminal positioned at the bottom left in FIG. 1. The distance between the signal electrode 31 and the ground electrode 32 (hereunder the electrode spacing) is greater than the electrode spacing in the forward modulation section 1A, and the electrode spacing in the inverse modulation section 1B is made relatively narrow. Furthermore, the cross-section shape of the signal electrode 31 is designed so that speed matching conditions of the light propagated through the optical waveguide 2, and the electric signal E are satisfied. If the electrode spacing is made relatively narrow, the impedance drops. Therefore here, as shown by the cross-section in FIG. 2, the cross-section area of a signal electrode 31B and a ground electrode 32B in the inverse modulation section 1B (at the bottom of FIG. 2) are each made smaller than the cross-section of a signal electrode 31A and a ground electrode 32A in the forward modulation section 1A (the top of FIG. 2), so that a desired impedance (for example 50 Ω or the like) is obtained.

In the case where the cross-section of the electrode is changed in the forward modulation section 1A and the inverse modulation section 1B, it is necessary to pay attention to the connection with the outside. The connection with the outside is generally for example performed by bonding wire to an electrode pad provided on the substrate 1. However at this time, bonding is easier if the electrode pad on the input side and the terminal side are the same shape. Furthermore, it is better to arrange each of the cross-sections in order to also easily match the impedance from the interactive portion to the electrode pad, on the input side and the terminal side. Consequently, in FIG. 1, it is preferable to design so that the cross-section of the signal electrode 31 from the input electrode pad which applies the electric signal E, up until the region A, and the cross-section of the signal electrode 31 which passes through the region B and extends to the terminal electrode pad are the same. Furthermore, in the signal electrode 31 of the boundary portion directed from the forward modulation section 1A to the inverse modulation section 1B, preferably the cross-section area is made gradually smaller, to suppress an increase in the series resistance.

Next is a description of the operation of the optical modulator of the first embodiment.

In the optical modulator of the aforementioned configuration, light Lin applied from the outside to the input waveguide 21 is branched into two by the branching section 22 and respectively sent to the branching waveguides 23 and 24. To the branching waveguides 23 and 24 is applied an electric field generated between the signal electrode 31 and the ground electrode 32 corresponding to the electric signal E which travels on the signal electrode 31, and due to the electro-optic effect of this electric field, the refractive index of the branching waveguides 23 and 24 changes. As a result, the phases of the respective beams propagated through the branching waveguides 23 and 24 are each changed.

At this time, the electric signal E input to the signal electrode 31 is attenuated while propagating through the signal electrode 31, and the attenuation amount becomes greater at a high frequency. However, by forming the polarization inversed region 11 on the output side portion of the interaction section, and making the direction of modulation at the interaction section forward modulation in the input side region A, and inverse modulation in the output side region B, the intensity of the inverse modulation in the region B becomes greater at a low frequency, and is less at a high frequency. As a result, the modulation at a low frequency for the overall optical modulator is suppressed and the modulation bandwidth becomes wider.

Furthermore, in the present embodiment, by making the electrode spacing of the inverse modulation section 1B (region B) narrow with respect to the electrode spacing of the forward modulation section 1A (region A), the transmission loss of the high frequency component of the electrical signal E in the inverse modulation section 1B due to the skin effect is intentionally increased. For example, in the case of an optical modulator of 10 Gb/s, it is good to increase the transmission loss of the electric signal E at a high frequency of 10 GHz or more. As a result, the inverse modulation in the high frequency band in the inverse modulation section 1B is suppressed, and hence it is possible to realize an even wider modulation bandwidth. In addition, the spacing of the branching waveguides 23 and 24 also becomes relatively narrow corresponding to the electrode spacing of the inverse modulation section 1B. Therefore, the situation where the effect of applying the electric field is reduced in the inverse modulation section 1B is also avoided.

Figure 3:
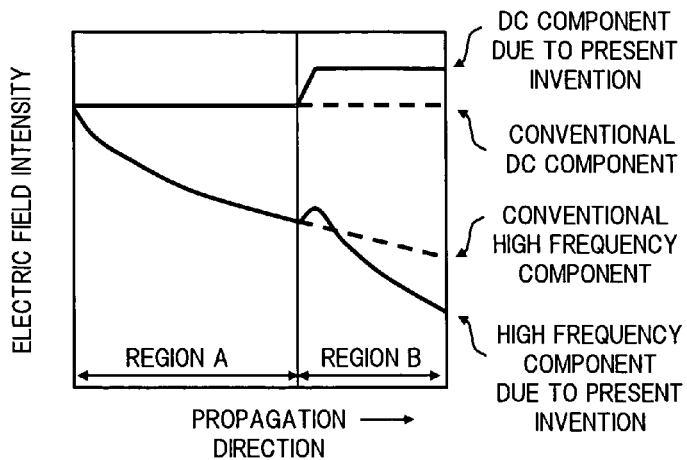
FIG. 3 is a diagram showing an example of change in electric field intensity in each region of the first embodiment.
Figure 4:
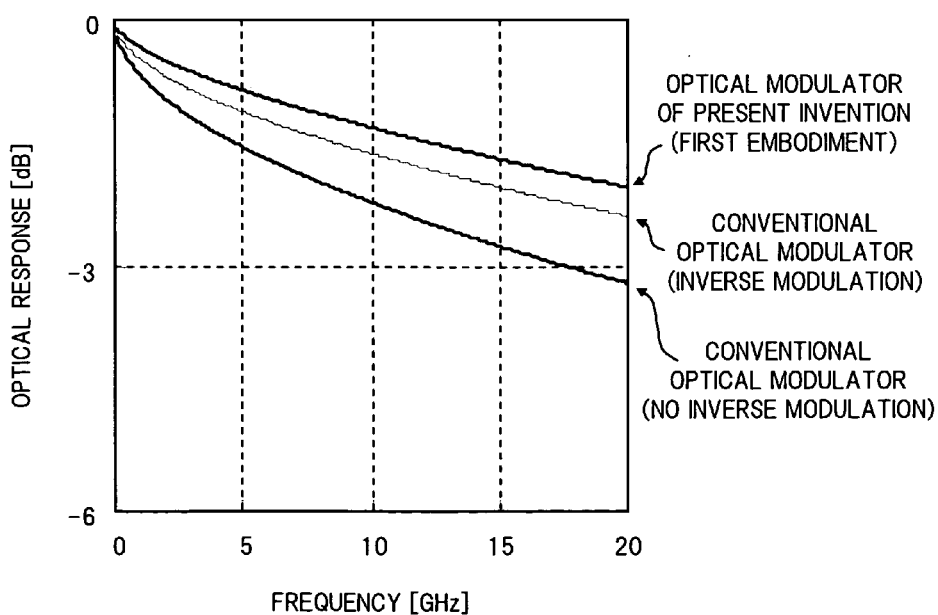
FIG. 4 is a diagram showing an example of optical response characteristics in the first embodiment.

FIG. 3 shows an example of change in electric field intensity in the regions A and B. Furthermore, FIG. 4 shows an example of optical response characteristics of the present optical modulator.

Figure 29:
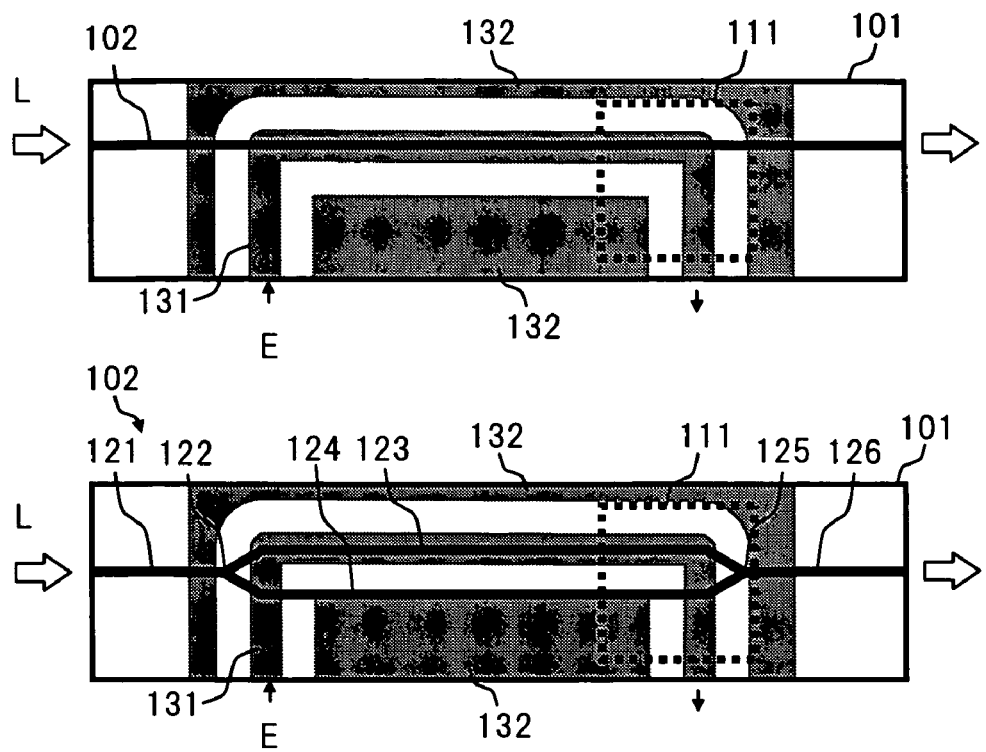
FIG. 29 is a plan view showing a configuration example of a conventional optical modulator which uses inverse modulation.

As shown in FIG. 3, in the optical modulator, by making the electrode spacing of the region B relatively narrow, the electric field intensity corresponding to the high frequency component in the region B becomes generally greater at the boundary portion with the region A, and thereafter is attenuated considerably more than for the case of the conventional optical modulator (refer to the bottom of FIG. 29). As a result, the intensity of inverse modulation at a high frequency in the region B is less than heretofore. On the other hand, the electric field intensity for a low frequency (here shown by the DC component) becomes greater over the whole of the region B by making the electrode spacing narrow. Therefore, the intensity of the inverse modulation at a low frequency is greater than heretofore. Consequently, as shown in FIG. 4, the modulation bandwidth of the optical modulator of the first embodiment is an even wider bandwidth than for the case of the conventional optical modulator with inverse modulation.

Figure 5:
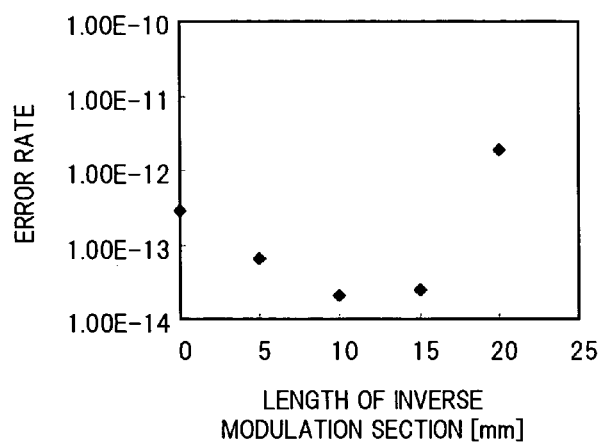
FIG. 5 is a diagram showing an example of a relationship between length of an inverse modulation section and an error rate in the first embodiment.

The modulation bandwidth of the present optical modulator becomes wider accompanying the increase in the proportion of the length of the inverse modulation section 1B with respect to the overall length of the interactive portion. However, if the proportion of the length of the inverse modulation section 1B becomes somewhat large, it is difficult for modulation at the low frequency. Therefore, it is necessary to optimally design the proportion of the length of the inverse modulation section 1B to realize a wider band, taking into consideration the necessary degree of modulation. FIG. 5 is an example showing a relation between the length of the inverse modulation section 1B and error rate. The situation is apparent that when the inverse modulation section 1B is short, the effect of widening the band cannot be sufficiently obtained, and the error rate worsens, while when the inverse modulation section 1B is long, the degree of modulation becomes low, and hence the error rate worsens.

As described above, the respective beams which are propagated through the branching waveguides 23 and 24 of the forward modulation section 1A and the inverse modulation section 1B, and phase modulated, are multiplexed by the multiplexing section 25, so that an intensity modulated signal Lout is output from the output waveguide 26.

According to the first embodiment as described above, by making the electrode spacing of the inverse modulation section 1B relatively narrow with respect to the electrode spacing of the forward modulation section 1A, and increasing the transmission loss of the electrical signal of a high frequency in the inverse modulation section 1B, it is possible to make the modulation bandwidth in the overall optical modulator even wider.

In the above described first embodiment, by making the electrode spacing in the inverse modulation section 1B relatively narrow, the high frequency transmission loss is increased. However as shown for example in the cross-section of FIG. 6, also by making the width of the signal electrode 31B of the inverse modulation section 1B relatively narrower than the width of the signal electrode 31A of the forward modulation section 1A, it is possible to increase the high frequency transmission loss. In this case also, a similar operational effect to the case of the first embodiment can be obtained.

Figure 7:
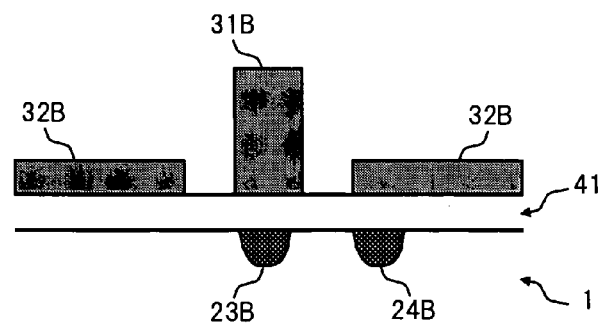
FIG. 7 is a cross-section showing yet another configuration example related to the first embodiment.

Furthermore, in the first embodiment, an example was shown for preventing the drop in the impedance due to the relatively narrow electrode spacing, by respectively reducing the cross-sections of the signal electrode 31B and the ground electrode 32B of the inverse modulation section 1B. However, as shown for example in the cross-section b-b' of FIG. 7, even if just the cross-section area of the ground electrode 32B is reduced, but the cross-section area of the signal electrode 31B is substantially the same as on the forward modulation section 1A side, it is possible to realize a desired impedance.

In this case, the problem of the increase in the series resistance in the boundary portion of the forward modulation section 1A and the inverse modulation section 1B does not arise.

Figure 8:
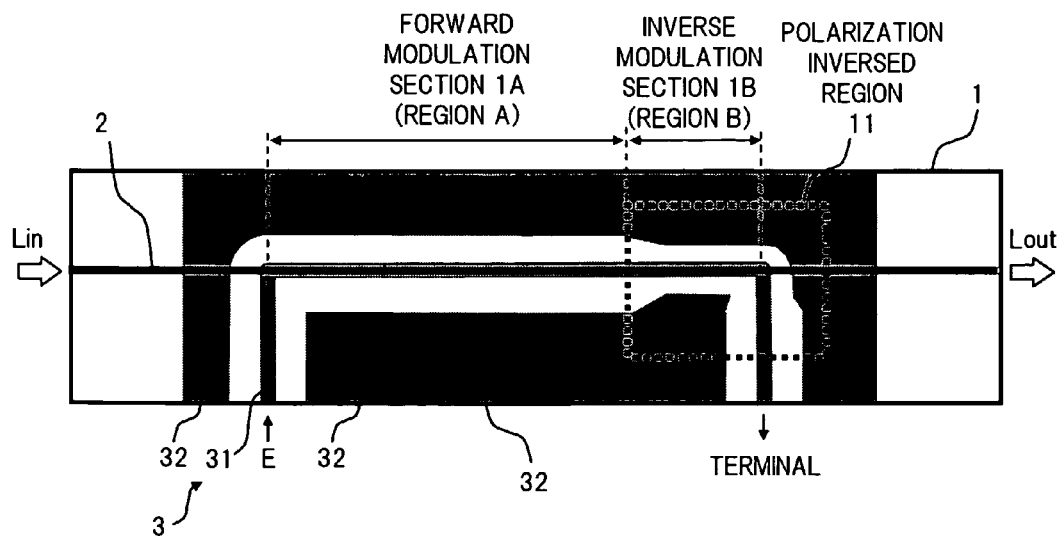
FIG. 8 is a plan view showing a configuration example of a case where the configuration of the first embodiment is applied to a phase modulator.

Furthermore, in the first embodiment, the case was explained where the present invention was applied to the beforementioned conventional intensity modulator shown at the bottom of FIG. 29. However, similar to this, the present invention is also applicable to the conventional phase modulator shown at the top of FIG. 29. The configuration example for this case is shown in FIG. 8. Also in the configuration example of FIG. 8, by making the electrode spacing of the inverse modulation section 1B (region B) relatively narrower than the electrode spacing of the forward modulation section 1A (region A), and increasing the transmission loss of the high frequency electric signal E in the inverse modulation section 1B, a wider phase modulation bandwidth can be realized.

In addition, in the first embodiment, the example was shown for the case using a Z-cut substrate 1. However also in the case where the optical modulator is configured using an X-cut substrate, then similar to the case of the first embodiment, by adapting a configuration where the electrode spacing of the inverse modulation section is made narrow, an even wider modulation bandwidth can be realized, and the present invention is thus effective.

Next is a description of a second embodiment of the present invention.

Figure 9:
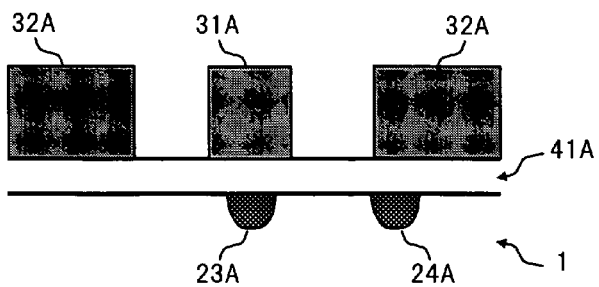
FIG. 9 shows an enlarged cross-section of respective sections in an optical modulator according to a second embodiment of the present invention.
Figure 9:
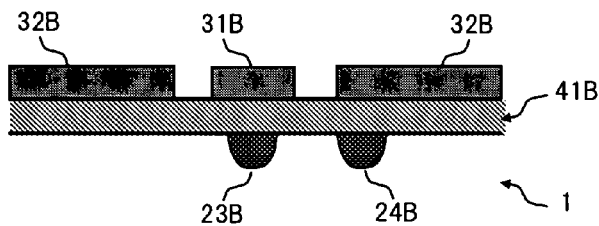

FIG. 9 shows an enlarged cross-section of respective sections in an optical modulator according to the second embodiment of the present invention. The plan view showing the configuration of the overall optical modulator of the second embodiment is similar to the case of the first embodiment shown in FIG. 1. Therefore, illustration is omitted here.

The optical modulator of the second embodiment is one where, for a buffer layer 41 formed between the surface of the substrate 1 and the signal electrode and the ground electrode, so that the dielectric loss of a buffer layer 41B (refer to the bottom of FIG. 9) positioned on the inverse modulation section 1B is greater than the dielectric loss of a buffer layer 41A (refer to the top of FIG. 9) positioned on the forward modulation section 1A, the substance constituting the respective buffer layers 41A and 41B is made different. The configuration other than for the buffer layers 41A and 41B is the same as for the case of the first embodiment.

It is known that the dielectric loss of the buffer layer changes corresponding to the value of the dielectric loss tangent (tan δ) of the substance constituting the buffer layer. More specifically, the greater the value of tan δ, the greater the dielectric loss of the buffer layer. If the buffer layer dielectric loss becomes greater, the high frequency electric field intensity is reduced. Therefore in the region where such a buffer layer is formed, the modulation bandwidth becomes narrow.

Figure 10:
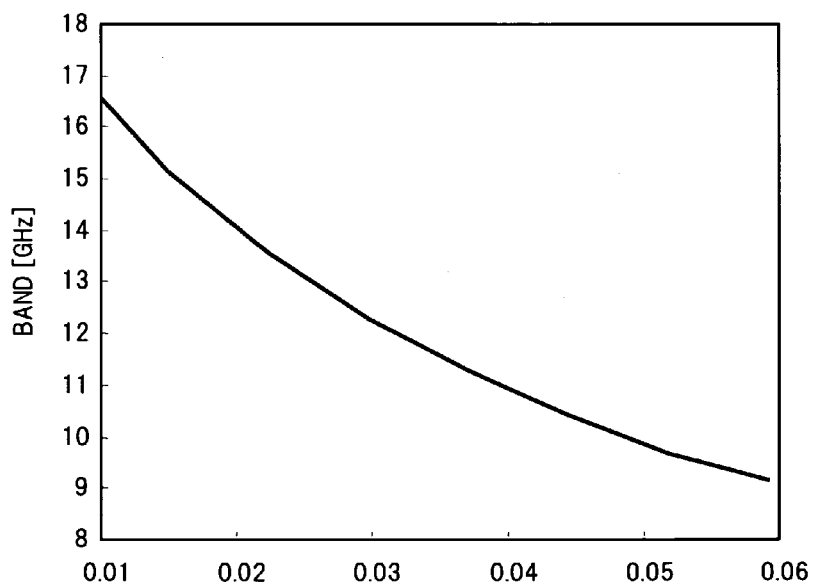
FIG. 10 is a diagram showing a relation of modulation bandwidth with respect to tan δ of a substance constituting a buffer layer in the second embodiment.

FIG. 10 is an example showing a relation of modulation bandwidth with respect to the value of tan δ of the substance constituting the buffer layer. In this manner, by configuring the buffer layer using a substance where the tan δ of the substance is large, it is possible to make the modulation intensity of the high frequency component in the region where the buffer layer is formed small. In this embodiment, by making the value of tan δ of the substance constituting the buffer layer 41B on the inverse modulation section 1B side greater than the value of tan δ of the substance constituting the buffer layer 41A on the forward modulation section 1A side, the inverse modulation intensity of the high frequency component in the inverse modulation section 1B becomes smaller.

Consequently, according to the optical modulator of the second embodiment, similar to the case of the first embodiment, in addition to making the electrode spacing of the inverse modulation section 1B narrow so that the propagation loss of the high frequency electric signal is increased, by increasing the dielectric loss of the buffer layer 41B, it is possible to make the modulation bandwidth of the overall optical modulator even wider.

Figure 11:
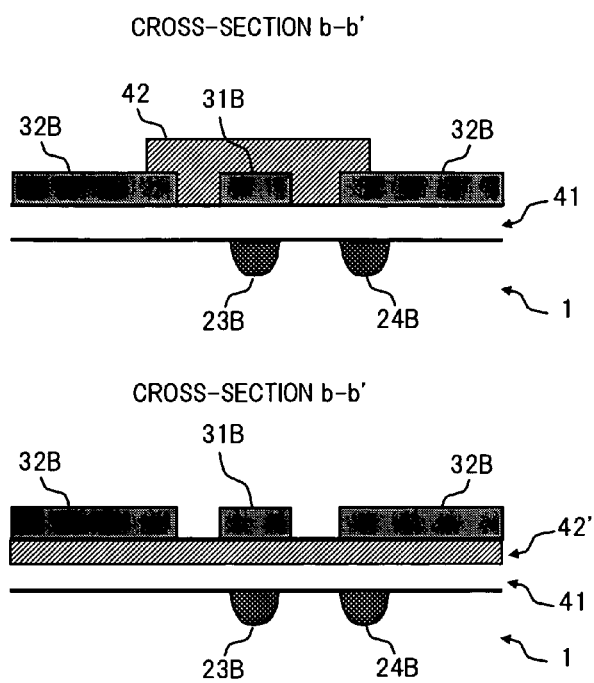
FIG. 11 is a cross-section showing another configuration example related to the second embodiment.

In the abovementioned second embodiment, the configuration example is shown where the dielectric loss of the buffer layer 41B formed between the substrate 1 and the electrode 3 is increased. However as shown for example in the cross-section b-b' at the top of FIG. 11, even if instead of the buffer layer 41B, a configuration is adopted where the surroundings of the signal electrode 31B in the inverse modulation section 1B, are covered by a substance 42 with a greater dielectric loss than the substrate 1, or a configuration is adopted where as shown in the cross-section b-b' at the bottom of FIG. 11, a film 42' with a large dielectric loss is provided between the electrode 3 and the buffer layer 41, it is possible to obtain a similar effect to the case of the second embodiment.

Furthermore, as an application example related to the second embodiment, even if the dielectric loss of the material constituting the signal electrode 31B of the inverse modulation section 1B is relatively large compared to the dielectric loss of the material constituting the signal electrode 31A of the forward modulation section 1A, it is possible to increase the bandwidth of the modulation bandwidth.

Figure 6:
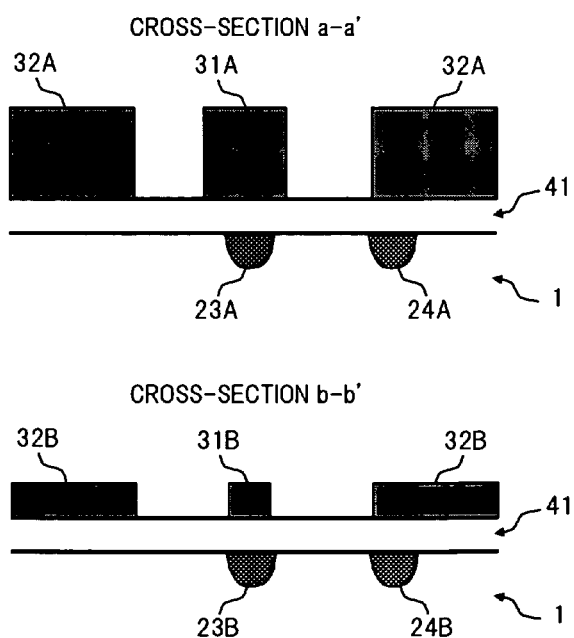
FIG. 6 is a cross-section showing another configuration example related to the first embodiment.

Moreover, in the abovementioned second embodiment, for the configuration of the first embodiment where the electrode spacing of the inverse modulation section 1B is narrow, the example is shown where the dielectric loss of the buffer layer 41B of the inverse modulation section 1B is great. However even for the phase modulator shown in FIG. 8, or for a configuration where the width of the abovementioned signal electrode shown in FIG. 6 is made narrow, by making the dielectric loss of the buffer layer of the inverse modulation section large, the modulation bandwidth can be made even wider.

In addition, in the abovementioned second embodiment, it has been considered to combine this with a configuration where the transmission loss of the high frequency electrical signal is increased by making the electrode spacing narrow. However, even if only the dielectric loss of the buffer layer of the inverse modulation section in the conventional optical modulator such as shown before in FIG. 29 is made large, the conventional modulation bandwidth can be made large, and hence the present invention is effective.

Next is a description of a third embodiment of the present invention.

Figure 12:
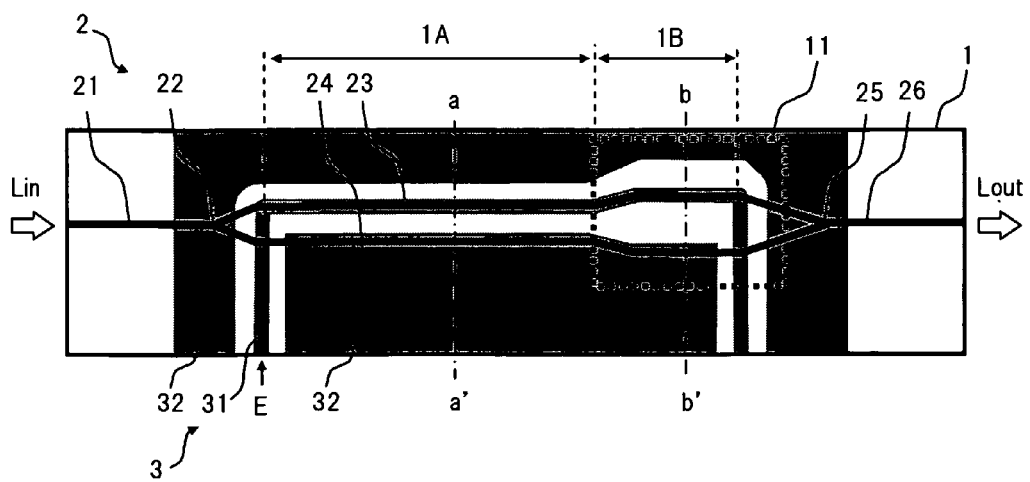
FIG. 12 is a plan view showing a configuration of an optical modulator according to a third embodiment of the present invention.

FIG. 12 is a plan view showing a configuration of an optical modulator according to the third embodiment of the present invention. Moreover, FIG. 13 is an enlarged view of section a-a' and section b-b' in the optical modulator of FIG. 12.

Figure 13:
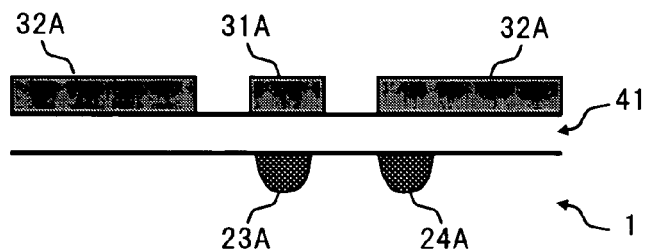
FIG. 13 is an enlarged view of section a-a' and section b-b' of FIG. 12.
Figure 13:
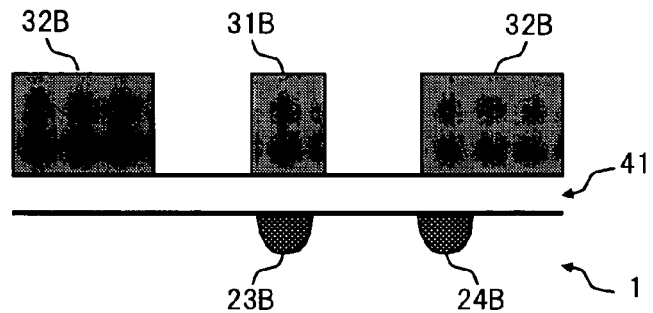

In FIG. 12 and FIG. 13, the point where the configuration of the optical modulator the third embodiment is significantly different to the configuration of the first embodiment shown in FIG. 1 and FIG. 2 is that regarding the distance (electrode spacing) between the signal electrode 31 and the ground electrode 32, the electrode spacing in the inverse modulation section 1B is relatively greater than the electrode spacing in the forward modulation section 1A. Furthermore, since the impedance increases if the electrode spacing is relatively increased, then by making the sectional area of the signal electrode 31B and the ground electrode 32B in the inverse modulation section 1B (the bottom of FIG. 13) respectively greater than the sectional area of the signal electrode 31A and the ground electrode 32A in the forward modulation section 1A, a desired impedance (for example 50 Ω or the like) is obtained. Furthermore, the spacing (waveguide spacing) of the branching waveguides 23B and 24B also becomes relatively wide corresponding to the electrode spacing of the inverse modulation section 1B. Other configuration of the optical modulator other than the configuration described above is similar to the configuration of the first embodiment. Therefore description is omitted here.

In the optical modulator of the abovementioned configuration, by relatively widening the electrode spacing of the inverse modulation section 1B, the high frequency component of the electric signal E propagated through the signal electrode 31B is easily radiated to the substrate 1 or to the atmosphere, so that the loss is increased. By increasing the radiation loss of the high frequency electric signal E in the inverse modulation section 1B, the inverse modulation in the high frequency band is suppressed. Therefore similarly to the case of the first embodiment, it is possible to realize an even wider modulation bandwidth. Furthermore, the spacing of the branching waveguides 23B and 24B also becomes relatively wide corresponding to the electrode spacing of the inverse modulation section 1B. Therefore the situation where the effect of applying the electric field is reduced in the inverse modulation section 1B is also avoided.

Figure 14:
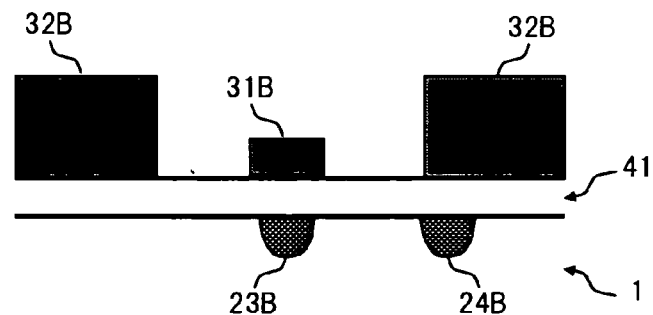
FIG. 14 is a cross-section showing another configuration example related to the third embodiment.

In the third embodiment, the example is shown for where the increase in the impedance due to making the electrode spacing relatively wider is prevented by making the sectional area of the signal electrode 31B and the ground electrode 32B of the inverse modulation section 1B respectively greater. However, as shown for example in the cross-section b-b' of FIG. 14, even if only the sectional area of the ground electrode 32B is made large, and the sectional area of the signal electrode 31B is made the same as for the forward modulation section 1A side, it is possible to realize a desired impedance.

Figure 15:
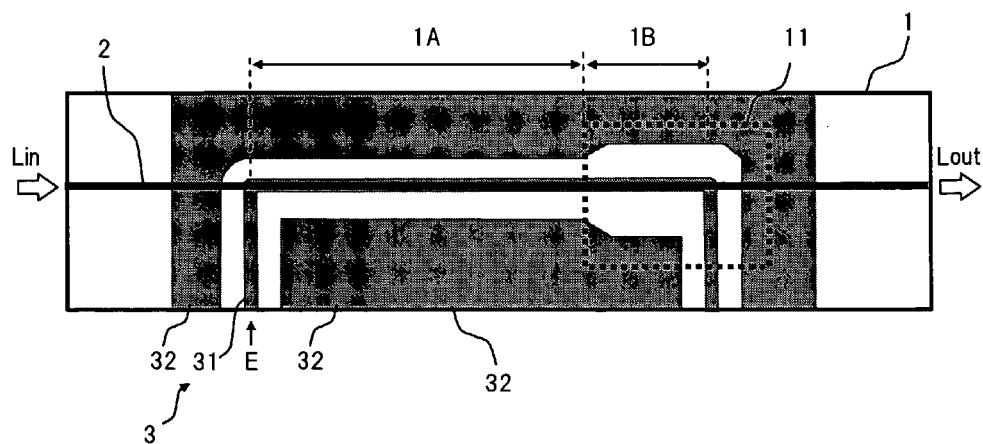
FIG. 15 is plan view showing a configuration example of a case where the configuration of the third embodiment is applied to a phase modulator.

Moreover, in the third embodiment, the case was explained where the present invention was applied to the beforementioned conventional intensity modulator shown at the bottom of FIG. 29. However, similar to this, the present invention is also applicable to the conventional phase modulator shown at the top of FIG. 29. The configuration example for this case is shown in FIG. 15. Also in the configuration example of FIG. 15, by making the electrode spacing of the inverse modulation section 1B relatively wider than the electrode spacing of the forward modulation section 1A, and increasing the transmission loss of the high frequency electric signal E in the inverse modulation section 1B, a wider phase modulation bandwidth can be realized.

Next is a description of a fourth embodiment of the present invention.

Figure 16:
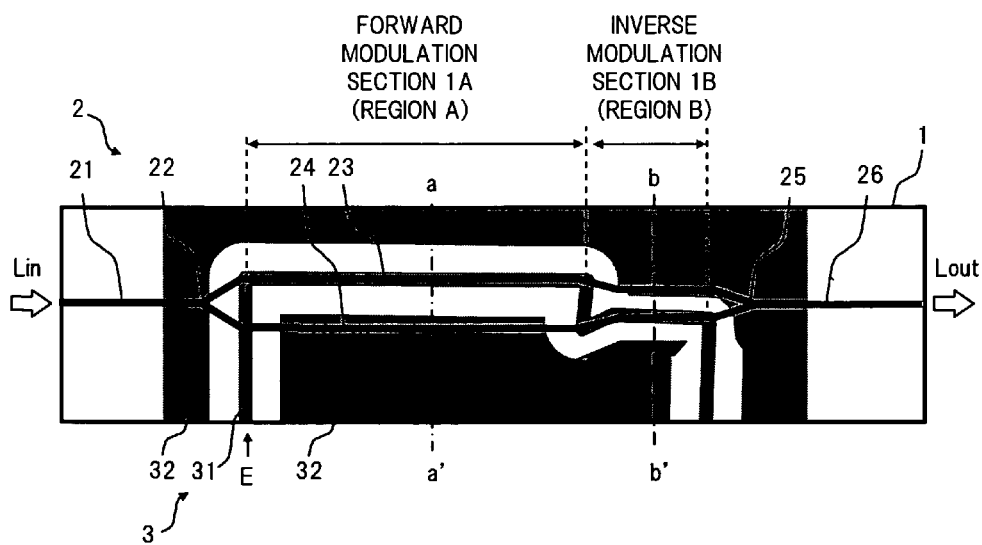
FIG. 16 is a plan view showing a configuration of an optical modulator according to a fourth embodiment of the present invention.

FIG. 16 is a plan view showing a configuration of an optical modulator according to the fourth embodiment of the present invention.

In FIG. 16, the point where the configuration of the optical modulator of the fourth embodiment differs to the case of the first embodiment, is that pattering of the electrode 3 is changed so that instead of forming the polarization inversed region 11 on the substrate 1, the signal electrode 31 is arranged above one branching waveguide 23 in the region A, and is arranged above the other branching waveguide 24 in the region B. Other configuration of the optical modulator other than for the above described point is similar to the configuration of the first embodiment. Therefore description is omitted here.

In the optical modulator of the above described configuration, the electrical signal E applied to one end of the signal electrode 31 propagates along the one branching waveguide 23 in the region A, and propagates along the other branching waveguide 24 in the region B. As a result, the direction of modulation in the region B is opposite to the direction of modulation in the region A, and hence the forward modulation section 1A (region A), and the inverse modulation section 1B (region B) are realized similarly to the case in the first embodiment where the polarization inversed region 11 is formed. Furthermore, in this embodiment however, since the electrode spacing of the forward modulation section 1A, the propagation loss of the high frequency electrical signal in the inverse modulation section 1B is increased, and the inverse modulation in the high frequency band is suppressed. Consequently an effect similar to the case of the first embodiment can be obtained, and also the step for forming the polarization inversed region on the substrate 1 becomes unnecessary so that inverse modulation in the region B can be realized by simply changing the pattern design of the electrode 3. Therefore, the configuration of the optical modulator becomes even simpler.

In the abovementioned fourth embodiment, the pattern of the electrode 3 in the configuration of the first embodiment is changed. However it is possible to apply a configuration similar to the fourth embodiment even for the configurations of the other embodiments.

Next is a description of a fifth embodiment of the present invention.

Figure 17:
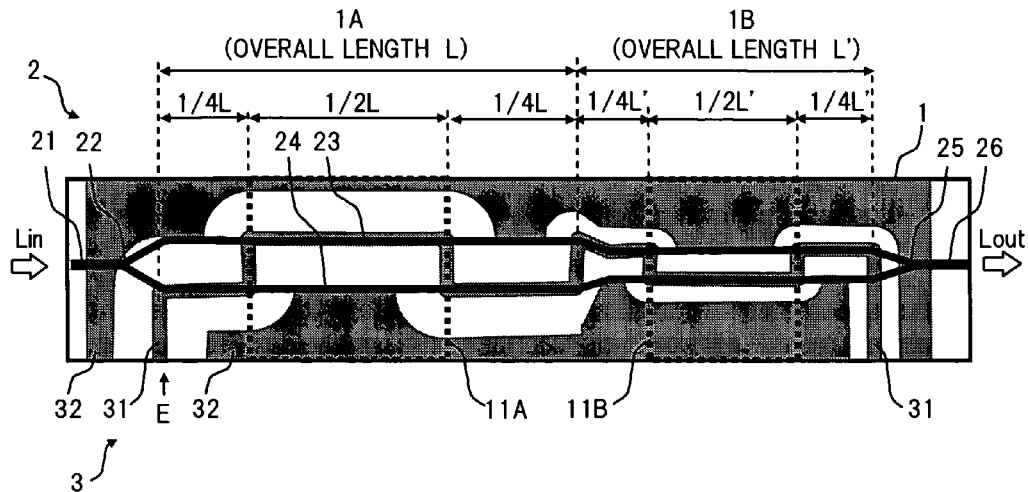
FIG. 17 is a plan view showing a configuration of an optical modulator according to a fifth embodiment of the present invention.

FIG. 17 is a plan view showing a configuration of an optical modulator according to the fifth embodiment of the present invention.

The optical modulator of the fifth embodiment is an application example of where a reduction in wavelength chirp in the optical modulator of, for example, the first embodiment is reduced. That is to say, in the optical modulator of the first embodiment, since the electric field intensity below the signal electrode 31, and the electric field intensity below the ground electrode 32 are different, the phase change of the respective lights propagating through the pair of branching waveguides 23 and 24 become unbalanced, and wavelength chirp (wavelength fluctuations) may occur. In order to suppress this wavelength chirp, it is effective to use movement between the branching waveguides 23 and 24 of the signal electrode 31 and use polarization inversion, together.

More specifically, in the optical modulator of this embodiment, as shown for example in FIG. 17, polarization inversed regions 11A and 11B surrounded by the dotted lines in the figure, are respectively formed on the forward modulation section 1A and the inverse modulation section 1B. The polarization inversed region 11A has a length in the propagation direction of the light of approximately half of the overall length L of the forward modulation section 1A, and is arranged in the approximate center of the forward modulation section 1A. Furthermore, the polarization inversed region 11B has a length in the propagation direction of the light of ½ of the overall length L' of the inverse modulation section 1B, and is arranged in the approximate center of the inverse modulation section 1B.

Moreover, the signal electrode 31 is patterned in a desired shape such that for the forward modulation section 1A, in the polarization inversed region 11A it passes above the branching waveguide 23, and outside of the polarization inversed region 11A it passes above the branching waveguide 24. Furthermore for the inverse modulation section 1B, in the polarization inversed region 11B it passes above the branching waveguide 24, and outside of the polarization inversed region 11B it passes above the branching waveguide 23. On the other hand, the ground electrode 32 is patterned in a desired shape such that for the forward modulation section 1A, in the polarization inversed region 11A it passes above the branching waveguide 24, and outside of the polarization inversed region 11A it passes above the branching waveguide 23. Furthermore, for the inverse modulation section 1B, in the polarization inversed region 11B it passes above the branching waveguide 23, and outside of the polarization inversed region 11B it passes above the branching waveguide 24. The distance (electrode spacing) between the signal electrode 31 and the ground electrode 32, similarly to the case of the first embodiment, is designed so that the electrode spacing in the inverse modulation section 1B is relatively narrower than the electrode spacing in the forward modulation section 1A.

In the optical modulator of the above described configuration, if this is designed so that in the length direction (overall length L) of the forward modulation section 1A, the length of the polarization inversed region 11A and the length of the non inversed region are approximately the same, that is, so that the lengths of the respective non inversed regions positioned before and after the polarization inversed region 11A become L/4, and the length of the polarization inversed region 11A becomes L/2, the phase of the light propagating through the branching waveguide 23 of the forward modulation section 1A changes by only $\theta_{23}$ as shown in the following equation (1), and the phase of the light propagating through the branching waveguide 24 of the forward modulation section 1A changes by only $\theta_{24}$ as shown by the following equation (2).

$$\theta_{23} = (+\Delta n_S) \cdot L/4 + (+\Delta n_G) \cdot L/2 + (+\Delta n_S) \cdot L/4 \quad (1)$$
$$= (\Delta n_S + \Delta n_G) \cdot L/2$$

$$\theta_{24} = (-\Delta n_G) \cdot L/4 + (-\Delta n_S) \cdot L/2 + (-\Delta n_G) \cdot L/4 \quad (2)$$
$$= -(\Delta n_S + \Delta n_G) \cdot L/2$$

where $\Delta n_S$ is the refractive index variation of the branching waveguides positioned below the signal electrode 31, and $\Delta n_G$ is the refractive index variation of the branching waveguides positioned below the ground electrode 32.

As is apparent from the above equation (1) and equation (2), the phase of the respective lights propagating through the branching waveguides 23 and 24 of the forward modulation section 1A respectively change by only $(+\Delta n_S) \cdot L/2$, and $(-\Delta n_G) \cdot L/2$ in the non inversed region, and respectively change by only $(+\Delta n_G) \cdot L/2$, and $(-\Delta n_S) \cdot L/2$ in the polarization inversed region 11A. Consequently, the phases of the respective lights which pass through the branching waveguides 23 and 24 and reach to the output end of the forward modulation section 1A change by only $+(\Delta n_S+\Delta n_G) \cdot L/2$, and $-(\Delta n_S+\Delta n_G) \cdot L/2$, giving a phase modulation where signals with the same absolute values are inverted. Therefore, in the forward modulation section 1A, wavelength chirp does not occur so that there is zero chirp.

Furthermore, also for the lengthwise direction (overall length L') of the inverse modulation section 1B, similar to the abovementioned forward modulation section 1A, if this is designed so that the length of the polarization inversed region 11B and the length of the non inversed region are approximately the same, the phase of the light propagating through the branching waveguide 23 of the inverse modulation section 1B changes by only $\theta_{23}'$ as shown in the following equation (1)', and the phase of the light propagating through the branching waveguide 24 of the inverse modulation section 1B changes by only $\theta_{24}'$ as shown by the following equation (2)'.

$$\theta'_{23} = (+\Delta n_G) \cdot L'/4 + (+\Delta n_S) \cdot L'/2 + (+\Delta n_G) \cdot L'/4 \quad (1)'$$
$$= -(\Delta n_S + \Delta n_G) \cdot L'/2$$

$$\theta'_{24} = (-\Delta n_S) \cdot L'/4 + (-\Delta n_G) \cdot L'/2 + (-\Delta n_S) \cdot L'/4 \quad (2)'$$
$$= -(\Delta n_S + \Delta n_G) \cdot L'/2$$

As is apparent from the above equation (1)' and equation (2)', the phase of the respective lights propagating through the branching waveguides 23 and 24 of the inverse modulation section 1B respectively change by only $(+\Delta n_G) \cdot L'/2$, and $(-\Delta n_S) \cdot L'/2$ in the non inversed region, and respectively change by only $(+\Delta n_S) \cdot L'/2$, and $(-\Delta n_G) \cdot L'/2$ in the polarization inversed region 11B. Consequently, the phases of the respective lights which pass through the branching waveguides 23 and 24 and reach to the output end of the inverse modulation section 1B change by only $+(\Delta n_S+\Delta n_G)$ ·L'/2, and −(Δn$_S$+Δn$_G$)·L'/2, giving a phase modulation where signals with the same absolute values are inverted. Therefore, in the inverse modulation section 1B also, wavelength chirp does not occur so that there is zero chirp.

In addition to realizing zero chirp in the forward modulation section 1A and the inverse modulation section 1B as described above, in the optical modulator, similar to the case of the fourth embodiment, since the electrode 3 is patterned so that the modulation direction in the region B positioned on the light output side becomes the opposite with respect to the modulation direction in the region A positioned on the light input side of the interaction section, the modulation band width is widened. That is to say, the electric signal E input to the signal electrode 31 is attenuated while propagating through the signal electrode 31, and the attenuation amount becomes larger at high frequency. However, by making the modulation direction at the interactive portion, forward modulation in the region A on the input side, and inverse modulation in the region B on the output side, the intensity of the inverse modulation in the region B becomes large at low frequency, and becomes small at high frequency. As a result, the modulation at low frequency in the overall optical modulator is suppressed, and the bandwidth is widened.

Furthermore, in the optical modulator, by making the electrode spacing of the inverse modulation section 1B relatively narrow with respect to the electrode spacing of the forward modulation section 1A, the transmission loss of the high frequency component of the electric signal E in the region B is increased. As a result, the inverse modulation in the high frequency band in the inverse modulation section 1B is suppressed, and hence it is possible to realize an even wider modulation bandwidth. In addition the spacing of the branching waveguides 23 and 24 also becomes relatively narrow corresponding to the electrode spacing of the inverse modulation section 1B. Therefore the situation where the effect of applying the electric field is reduced in the inverse modulation section 1B is also avoided.

Next is a description of a sixth embodiment of the present invention.

Figure 18:
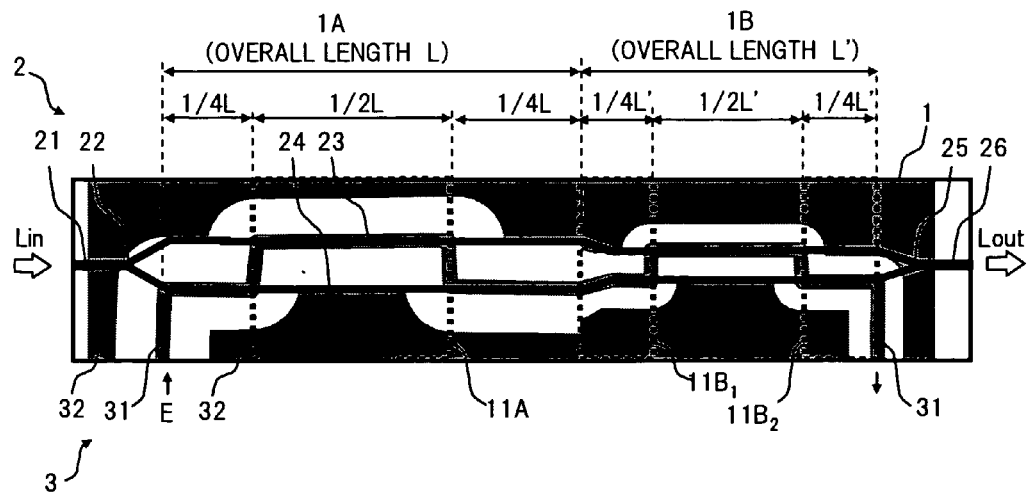
FIG. 18 is a plan view showing a configuration of an optical modulator according to a sixth embodiment of the present invention.

FIG. 18 is a plan view showing a configuration of an optical modulator according to the sixth embodiment of the present invention.

In FIG. 18, the point where the configuration of this embodiment is different from the case of the fifth embodiment shown in FIG. 17 is that the position of the polarization inversed region in the inverse modulation section 1B is changed, so that the arrangement pattern of the signal electrode 31 is simplified. More specifically, a polarization inversed region 11B$_1$ is formed in an interval from one end of the inverse modulation section 1B contacting with the forward modulation section 1A to a length of L'/4, and a polarization inversed region 11B$_2$ of a length L'/4 is formed with a non inversed region of a length L'/2 sandwiched between the polarization inversed regions 11B$_1$ and 11B$_2$. Furthermore, the pattern of the electrode 3 is changed so that in the respective polarization inversed regions 11B$_1$ and 11B$_2$, the signal electrode 31 is arranged above the branching waveguide 24, and the ground electrode 32 is arranged above the branching waveguide 23, and in the non inversed region positioned between the polarization inversed regions 11B$_1$ and 11B$_2$, the signal electrode 31 is arranged above the branching waveguide 23, and the ground electrode 32 is arranged above the branching waveguide 24.

According to the optical modulator of the above described configuration, a similar operational effect to the case of the fifth embodiment is obtained. Also it is not necessary to change over the arrangement pattern of the signal electrode 31 in the border portion of the forward modulation section 1A and the inverse modulation section 1B, from above the branching waveguide 24 to above the branching waveguide 23, as with the case of the fifth embodiment. Hence, the back and forth frequency of the signal electrode 31 between the respective branching waveguides 23 and 24 in the overall optical modulator can be reduced from three times to two times. By making the arrangement pattern of the signal electrode 31 simpler, an improvement effect of the propagation characteristic (for example loss or reflection and the like) of the electric signal E can be expected, and hence it becomes possible to even further widen the band width of the modulation bandwidth.

Next is a description of a seventh embodiment of the present invention.

Figure 19:
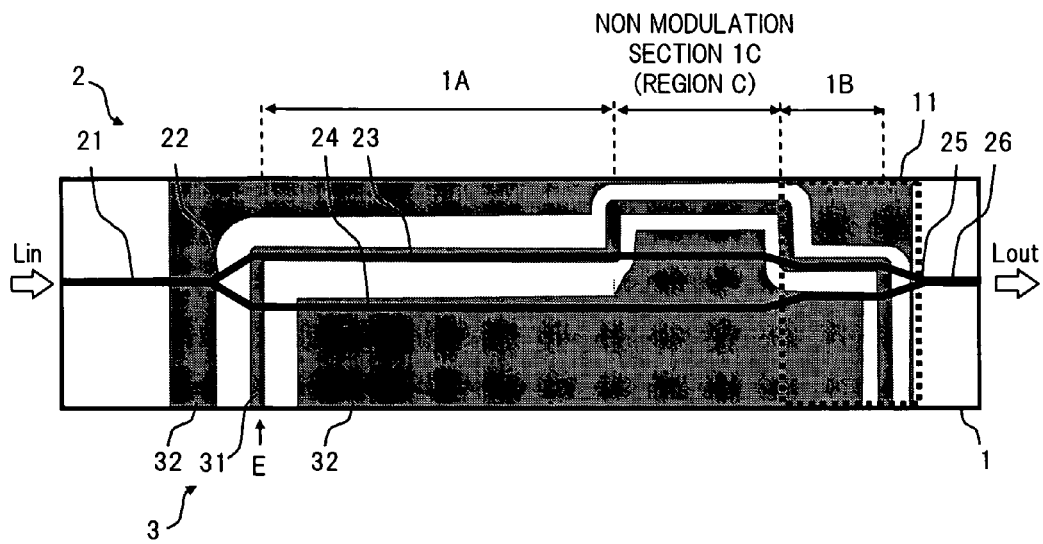
FIG. 19 is a plan view showing a configuration of an optical modulator according to a seventh embodiment of the present invention.

FIG. 19 is a plan view showing a configuration of an optical modulator according to the seventh embodiment of the present invention.

In FIG. 19, the optical modulator of the seventh embodiment is one where for example in the configuration of the first embodiment, a non modulation section 1C where there is no phase modulation in the light propagated through the respective branching waveguides 23 and 24, is provided in a third region C between the forward modulation section 1A (region A) and the inverse modulation section 1B (region B). Other configuration apart from this non modulation section 1C is similar to the case of the first embodiment. Therefore description is omitted here.

In the non modulation section 1C, the branching waveguides 23 and 24 are formed in a similar condition to the forward modulation section 1A, whereas the signal electrode 31 is arranged in a position separated from above the branching waveguide 23 (a position separated to the upper side from the branching waveguide 23 in FIG. 19). The distance (electrode spacing) of the signal electrode 31 and the ground electrode 32 in the non modulation section 1C is similar to the electrode spacing in the inverse modulation section 1B, and narrower than the electrode spacing in the forward modulation section 1A.

In the case where the non modulation section 1C is provided between the forward modulation section 1A and the inverse modulation section 1B, it is important to match the speed of the electrical signal and the light so that the modulation bandwidth is not worsened. Therefore, the electrical length of the signal electrode 31 in the non modulation section 1C and the optical length of the branching waveguides 23 and 24 are made to approximately coincide.

Figure 20:
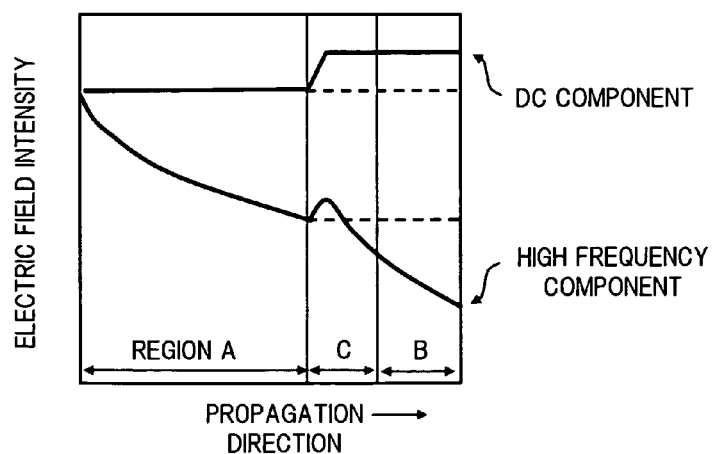
FIG. 20 is a diagram showing an example of change in electric field intensity in each region of the seventh embodiment.
Figure 21:
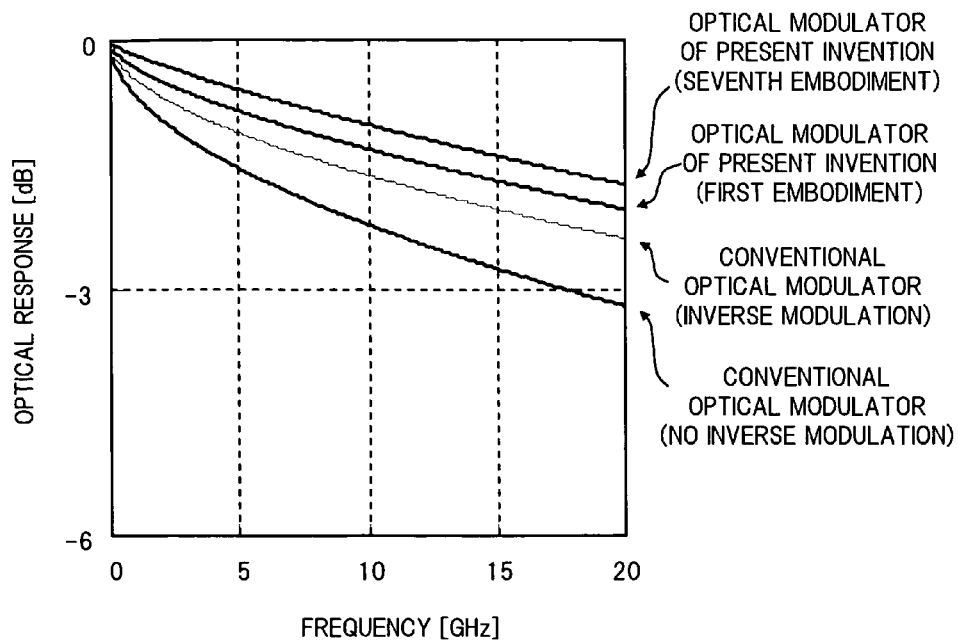
FIG. 21 is a diagram showing an example of optical response characteristics in the seventh embodiment.

In an optical modulator of the abovementioned configuration, the non modulation section 1C provided between the forward modulation section 1A and the inverse modulation section 1B is a low pass filter, and in the electric signal E propagated through the signal electrode 31, the high frequency component is attenuated from after passing through the forward modulation section 1A until it reaches the inverse modulation section 1B. FIG. 20 shows an example of the change in the electric field intensity in the respective regions A through C. Due to the skin effect due to the electrode spacing of the region C being made relatively narrow, the electric field intensity corresponding to the high frequency component in the region C, becomes temporarily great at the boundary portion of the region A, and thereafter is significantly attenuated. Therefore, the electric field intensity of the high frequency in the input end of the region B becomes smaller than for the case of the first embodiment shown in FIG. 4. As a result, the intensity of the inverse modulation at the high frequency in the region B becomes even smaller than for the case of the first embodiment. On the other hand, regarding the electric field intensity of the low frequency (here shown as a DC component), due to the electrode spacing being narrow, this becomes large over the whole of the region C and the region B. Therefore the intensity of the inverse modulation at the low frequency is increased. Consequently, as shown in FIG. 21, the modulation bandwidth of the optical modulator of the seventh embodiment is even wider than for the case of the optical modulator of the first embodiment.

Next is a description of an eighth embodiment of the present invention.

Figure 22:
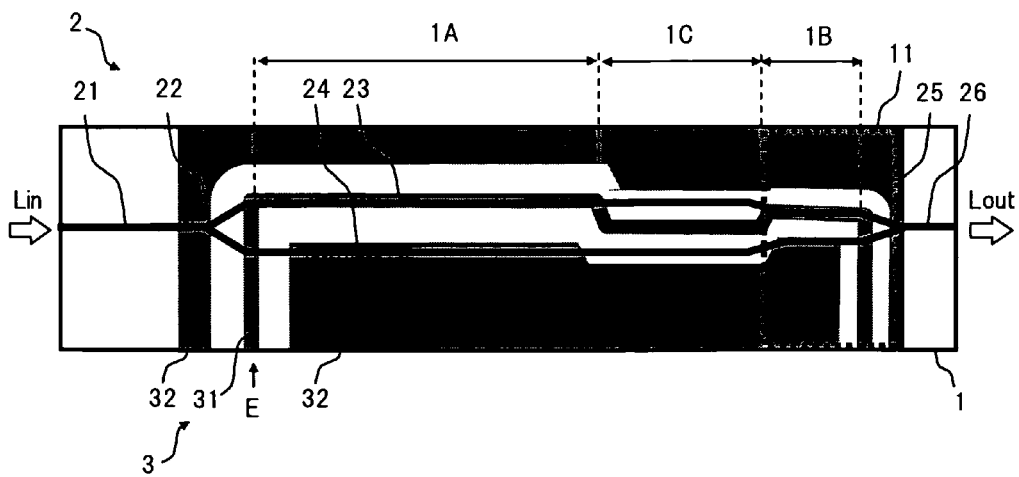
FIG. 22 is a plan view showing a configuration of an optical modulator according to an eight embodiment of the present invention.

FIG. 22 is a plan view showing a configuration of an optical modulator according to the eight embodiment of the present invention.

In FIG. 22, the optical modulator of the eight embodiment, is a modified example where in the configuration of the seventh embodiment shown in FIG. 19, the position of the signal electrode 31 in the non modulation section 1C is at the center of the pair of branching waveguides 23 and 24. In such a configuration, in the non modulation section 1C, an electric field of substantially the same size is applied to the branching waveguides 23 and 24. Therefore, the phase of the light propagating through each is maintained, and as a result there is no modulation. Consequently, according to the optical modulator of the eighth embodiment, even in the case where for example due to limitations in space on the substrate 1, it is difficult to have the situation as in the seventh embodiment where the signal electrode is away from above the branching waveguide, it is possible to achieve a similar operational effect to the case of the seventh embodiment.

Figure 23:
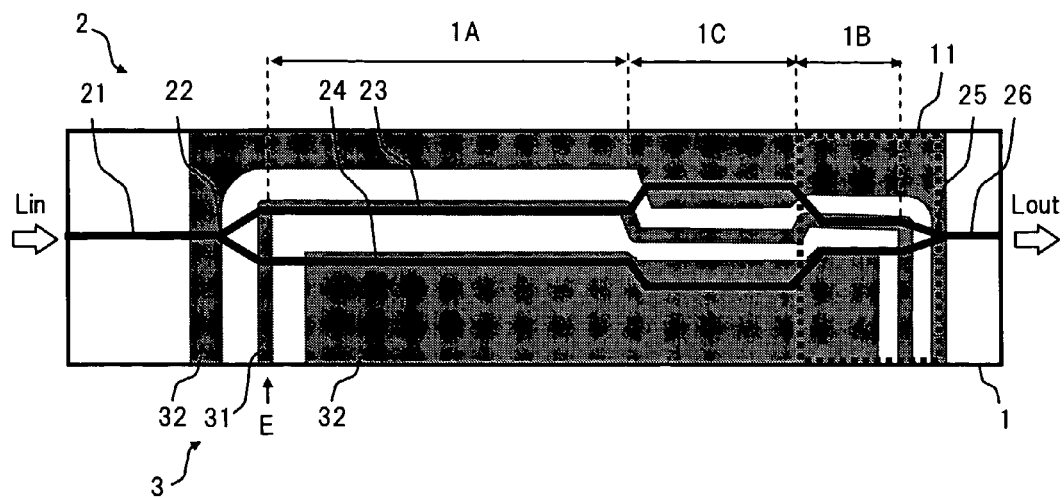
FIG. 23 is a cross-section showing another configuration example related to the eighth embodiment.

In the configuration of the eight embodiment, in the case where the pattern of the optical waveguide 2 and the electrode 3 is misaligned, the electric field applied to the branching waveguides 23 and 24 in the non modulation section 1C becomes different, so that there is the possibility of modulation being produced. In order to prevent such a situation, for example as shown in FIG. 23, the pattern of the optical waveguide may be modified so that the branching waveguides 23 and 24 in the non modulation section 1C are both positioned below the ground electrode 32. In this case, it is necessary to curve the branching waveguides 23 and 24 and widen the waveguide spacing. However a drop in the yield due to process error can be avoided.

Next is a description of a ninth embodiment of the present invention.

Figure 24:
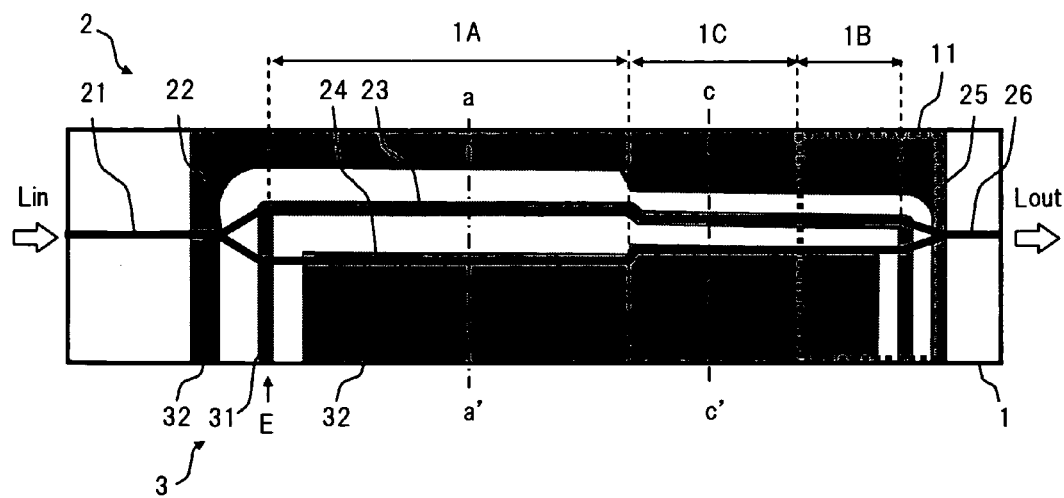
FIG. 24 is a plan view showing a configuration of an optical modulator according to a ninth embodiment of the present invention.

FIG. 24 is a plan view showing a configuration of an optical modulator according to the ninth embodiment of the present invention. Furthermore, FIG. 25 is an enlarged view of section a-a' and section c-c' in the optical modulator of FIG. 24.

Figure 25:
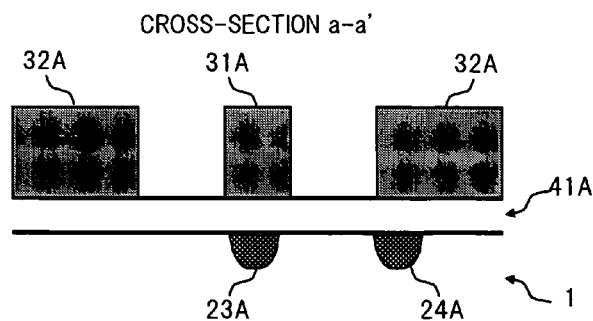
FIG. 25 is an enlarged view of section a-a' and section c-c' in FIG. 24.
Figure 25:
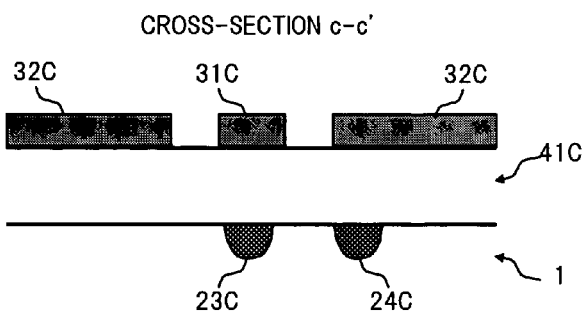

In FIG. 24 and FIG. 25, the optical modulator of the ninth embodiment is one where, as a separate configuration for realizing the non modulation section 1C provided between the forward modulation section 1A and the inverse modulation section 1B, a buffer layer 41C in the non modulation section 1C is made thicker than the buffer layer 41A in the forward modulation section 1A, and an electric field applied to branching waveguides 23C and 24C of the non modulation section 1C is decreased so that modulation does not occur. As a result, a signal electrode 31C of the non modulation section 1C is arranged above the branching waveguide 23 similar to with the other regions.

Also in the optical modulator of the above described configuration, it is possible to obtain a similar operational effect to the case of the seventh and eighth embodiments.

Figure 26:
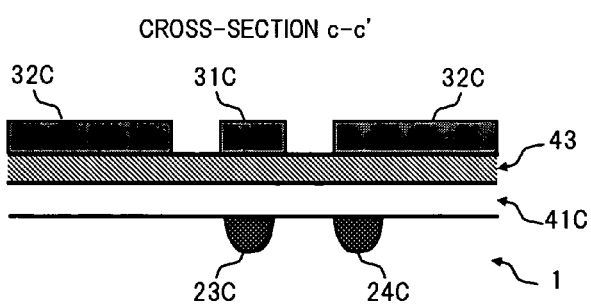
FIG. 26 is a cross-section showing another configuration example related to the ninth embodiment.
Figure 26:
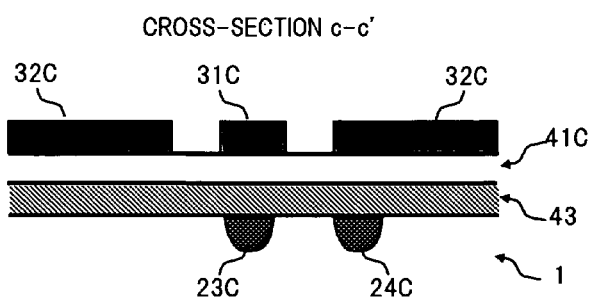

In the ninth embodiment, modulation was eliminated by making the buffer layer 41C of the non modulation section 1C thick. However for example as shown in the section c-c' at the top of FIG. 26, in the non modulation section 1C, by providing a film 43 different to the buffer layer 41C between the buffer layer 41C and the signal electrode 31C and the ground electrode 32, or as shown in the section c-c' at the bottom of FIG. 26, in the non modulation section 1C, by providing a film 43 which is different to the buffer layer 41 between the buffer layer 41C and the substrate 1, it is possible to realize a condition where it is even more difficult to have modulation. For the aforementioned film 43, a material may be used for which the dielectric loss at a high frequency is greater than that of the buffer layer 41C. In relation to applying either the configuration at the top or at the bottom of FIG. 26, the film 43 and the buffer layer 41C may be appropriately determined by considering the adhesion between these and the electrode 3 and the substrate 1.

Next is a description of an example of an optical transmitter which uses any of the aforementioned optical modulators of the first through ninth embodiments.

Figure 27:
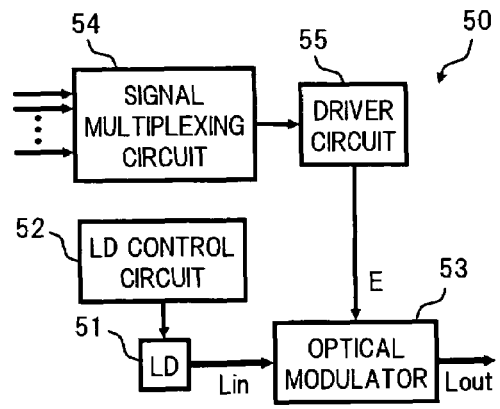
FIG. 27 is a block diagram showing a configuration of an embodiment of an optical transmitter according to the present invention.
Figure 28:
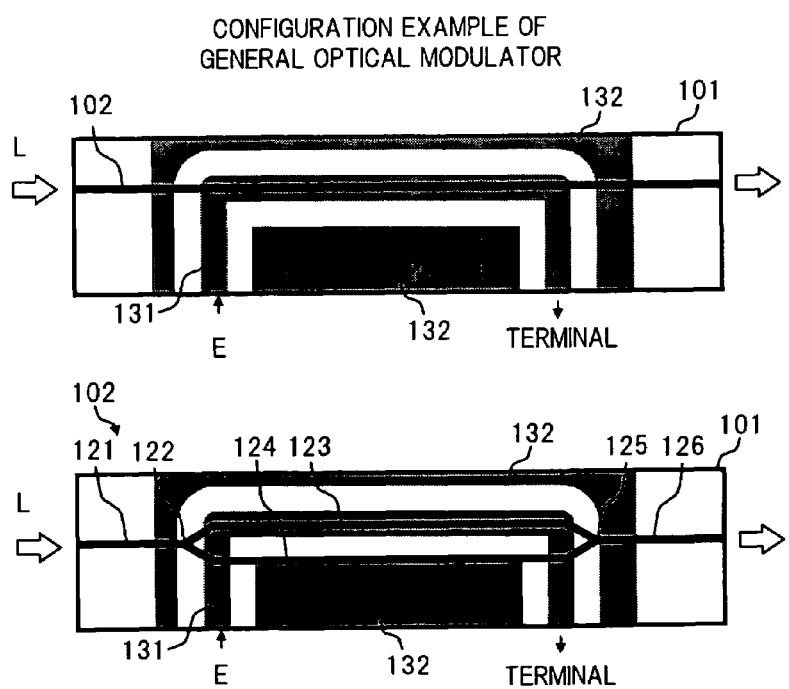
FIG. 28 is a plan view showing a configuration example of a general optical modulator.

FIG. 27 is a block diagram showing a configuration of an embodiment of the optical transmitter.

In FIG. 27, an optical transmitter 50 comprises a light source (LD) 51 which generates continuous light, an LD control circuit 52 which controls the drive state of the light source 51, an optical modulator 53 to which continuous light Lin output from the light source 51 is inputted, a signal multiplexing circuit 54 which multiplexes a plurality of data signals and generates a modulating signal with a high bit rate, and a driver circuit 55 which drives the optical modulator 53 in accordance with a modulation signal output from the signal multiplexing circuit 54.

As the optical modulator 53 which is installed in the optical transmitter 50 of such a configuration, by applying any one of the above described optical modulators of the first through ninth embodiments, it is possible to transmit an optical signal Lout having a wider band, so that a characteristic improvement in error rate or the like on the receiving side can be achieved.

What is claimed is:

1. An optical modulator comprising a substrate having an electro-optic effect, an optical waveguide formed on the substrate, a signal electrode formed on the substrate, and a ground electrode formed on the substrate at a position spaced apart from the signal electrode, and having a configuration in which, in an interaction section where light propagated through the optical waveguide, and an electrical signal propagated through the signal electrode interact with each other, a first region positioned on an input side in a light propagation direction, and a second region positioned on an output side are set, and a direction of a change in an optical phase determined depending on a relationship between a polarizing direction of the substrate and a direction of an electric field interacting with the light in each of the first and second regions is reversed, wherein the first and second regions are configured in a manner such that an electrical loss per unit length produced over an entire region of the second region is relatively higher in its value than the electrical loss per unit length produced in the first region, with respect to a frequency signal component that is contained in the electrical signal propagated through the signal electrode and corresponds to optical modulating speed.

2. An optical modulator according to claim 1, wherein a spacing of the signal electrode and the ground electrode in the second region is made narrower than a spacing of the signal electrode and the ground electrode in the first region.

3. An optical modulator according to claim 2, wherein cross-section areas of the signal electrode and the ground electrode in the second region are made smaller than respective cross-section areas of the signal electrode and the ground electrode in the first region.

4. An optical modulator according to claim 2, wherein cross-section areas of the signal electrode in the first and second regions are substantially the same, and a cross-section area of the ground electrode in the second region is made smaller than a cross-section area of the ground electrode in the first region.

5. An optical modulator according to claim 1, wherein a width of the signal electrode in the second region is made narrower than a width of the signal electrode in the first region.

6. An optical modulator according to claim 1, wherein the signal electrode and the ground electrode are formed on the substrate via a buffer layer, and with respect to a frequency signal component that is contained in the electric signal propagated through the signal electrode and corresponds to the optical modulating speed, an electrical loss per unit length of the buffer layer in the second region is greater than an electrical loss per unit length of the buffer layer in the first region.

7. An optical modulator according to claim 6, wherein a surface of the signal electrode in the second region which is not in contact with the buffer layer are covered by a substance with a greater electrical loss than the substrate.

8. An optical modulator according to claim 1, wherein the signal electrode and the ground electrode are formed on the substrate via a buffer layer, and a film with a greater electrical loss than the buffer layer with respect to a frequency signal component that is contained in the electric signal propagated through the signal electrode and corresponds to the optical modulating speed, is provided between the buffer layer, and the signal electrode and the ground electrode in the second region.

9. An optical modulator according to claim 1, wherein with respect to a frequency signal component that is contained in the electric signal propagated through the signal electrode and corresponds to the optical modulating speed, a conductor loss of a material constituting the signal electrode in the second region is greater than a conductor loss of a material constituting the signal electrode in the first region.

10. An optical modulator according to claim 1, wherein a spacing of the signal electrode and the ground electrode in the second region is made larger than a spacing of the signal electrode and the ground electrode in the first region.

11. An optical modulator according to claim 10, wherein cross-section areas of the signal electrode in the second region are made smaller than respective cross-section areas of the signal electrode in the first region.

12. An optical modulator according to claim 10, wherein cross-section areas of the signal electrode in the first and second regions are substantially the same, and a cross-section area of the ground electrode in the second region is made greater than a cross-section area of the ground electrode in the first region.

13. An optical modulator according to claim 1, wherein there is provided a polarization inversed region in which a polarization direction in the second region of the substrate is inversed with respect to a polarization direction in the first region of the substrate.

14. An optical modulator according to claim 1, wherein the optical waveguide has a configuration of a Mach-Zehnder interferometer, where light input to an input waveguide is branched into two in a branching section and respectively sent to a pair of branching waveguides, and light propagated through the branching waveguides is multiplexed in a multiplexing section and output from an output waveguide.

15. An optical modulator according to claim 14, having a polarization inversed region in which a polarization direction in the second region of the substrate is inversed with respect to a polarization direction in the first region of the substrate, and the signal electrode is formed along a branching waveguide of one of the pair of branching waveguides in the first and second regions, and the ground electrode is formed along a branching waveguide of another of the pair of branching waveguides in the first and second regions.

16. An optical modulator according to claim 14, wherein the signal electrode is formed along a branching waveguide of one of the pair of branching waveguides in the first region, and is formed along a branching waveguide of another of the pair of branching waveguides in the second region, and the ground electrode is formed along the other branching waveguide in the first region, and is formed along the one branching waveguide in the second region.

17. An optical modulator according to claim 14, wherein spacings of the pair of branching waveguides in the first and second regions are respectively set corresponding to spacings of the signal electrode and the ground electrode in the first and second regions.

18. An optical modulator according to claim 14, wherein the first and second regions each have a polarization inversed region where a polarization direction of a part of the region is inversed with respect to a polarization direction of a remaining part of the region, and an arrangement pattern is determined so that the signal electrode is arranged above either one of the pair of branching waveguides corresponding to a position of the polarization inversed region in the first and second regions, and a direction of modulation in the second region with respect to a direction of modulation in the first region are reversed.

19. An optical modulator according to claim 18, wherein the first and second regions have the polarization inversed region in a central portion of each of the regions, in a light propagation direction.

20. An optical modulator according to claim 18, wherein one region of the first and second regions has the polarization inversed region in a central portion, in a light propagation direction, and opposite end portions are made non inversed regions, and wherein another region of the first and second regions has the polarization inversed region in opposite end portions, in a light propagation direction, and a central portion is made a non inversed region.

21. An optical modulator according to claim 1, wherein a third region where light propagated through the optical waveguide is not modulated, is provided between the first and second regions.

22. An optical modulator according to claim 21, wherein a signal electrode in the third region is arranged at a position separated from above the optical waveguide.

23. An optical modulator according to claim 21, wherein the optical waveguide has a configuration of a Mach-Zehnder interferometer, where light input to an input waveguide is branched into two in a branching section and respectively sent to a pair of branching waveguides, and light propagated through the branching waveguides is multiplexed in a multiplexing section and output from an output waveguide, and a signal electrode in the third region is arranged at the center of the pair of branching waveguides.

24. An optical modulator according to claim 23, wherein the pair of branching waveguides in the third region are each arranged beneath the ground electrode.

25. An optical modulator according to claim 21, wherein when the signal electrode and the ground electrode are formed on a buffer layer, the buffer layer in the third region is made thicker than the buffer layer in the first and second regions.

26. An optical modulator according to claim 21, wherein when the signal electrode and the ground electrode are formed on a buffer layer, a film which is different from the buffer layer is provided between the buffer layer, and the ground electrode and the signal electrode in the third region.

27. An optical modulator according to claim 21, wherein when the signal electrode and the ground electrode are formed on a buffer layer, a film which is different from the buffer layer is provided between the buffer layer and the substrate in said third region.

28. An optical modulator according to claim 21, wherein in the first through third regions, a loss produced in the second and third regions is relatively greater than a loss produced in the first region, with respect to a frequency signal component that is contained in the electric signal propagated through the signal electrode and corresponds to optical modulating speed.

29. An optical modulator according to claim 21, wherein in the third region, an electrical length of the signal electrode and an optical length of the branching waveguide are made to approximately coincide.

30. An optical transmitter which uses an optical modulator according to claim 1 to externally modulate and transmit an outgoing beam from a light source.

31. An apparatus for modulating light by applying an electric signal to a signal electrode formed along an optical waveguide to thereby modulate light propagating through said optical waveguide, wherein in an interaction section where light propagated through the optical modulator and an electrical signal propagated through the signal electrode interact with each other, a first region positioned on an input side in a light propagation direction, and a second region positioned on an output side are set, and a direction of a change in an optical phase determined depending on a relationship between a polarizing direction of the substrate and a direction of an electric field interacting with the light in each of the first and second regions is reversed, and an electrical loss per unit length produced over the second region is relatively higher in its value than the electrical loss per unit length produced in the first region, with respect to a frequency signal component that is contained in the electric signal propagated through the signal electrode and corresponds to optical modulating speed.

* * * * *

UNITED STATES PATENT AND TRADEMARK OFFICE
CERTIFICATE OF CORRECTION

| | |
|---|---|
| PATENT NO. | : 7,400,786 B1 |
| APPLICATION NO. | : 11/646452 |
| DATED | : July 15, 2008 |
| INVENTOR(S) | : Masaki Sugiyama |

Page 1 of 1

It is certified that error appears in the above-identified patent and that said Letters Patent is hereby corrected as shown below:

Column 20, Line 9, change "modulator" to --waveguide--.

Signed and Sealed this

Eleventh Day of November, 2008

JON W. DUDAS
*Director of the United States Patent and Trademark Office*